(12) United States Patent
Gerber et al.

(10) Patent No.: US 9,780,539 B2
(45) Date of Patent: Oct. 3, 2017

(54) METHOD OF EXTRACTING A JACKET OF A GAS INSULATED SUBSTATION (GIS) UNDER A METAL CASING

(71) Applicant: Alstom Technology Ltd., Baden (CH)

(72) Inventors: Heinz Gerber, Unterentfelden (CH); Robert Lüscher, Seon (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 80 days.

(21) Appl. No.: 14/769,853

(22) PCT Filed: Feb. 21, 2014

(86) PCT No.: PCT/EP2014/053407
§ 371 (c)(1),
(2) Date: Aug. 24, 2015

(87) PCT Pub. No.: WO2014/128251
PCT Pub. Date: Aug. 28, 2014

(65) Prior Publication Data
US 2016/0020587 A1    Jan. 21, 2016

(30) Foreign Application Priority Data
Feb. 25, 2013 (FR) .................... 13 51636

(51) Int. Cl.
*H02B 1/00* (2006.01)
*H02B 5/00* (2006.01)
(Continued)

(52) U.S. Cl.
CPC ............. *H02B 13/005* (2013.01); *H02B 1/16* (2013.01); *H02B 1/20* (2013.01); *H02B 3/00* (2013.01); *H02B 5/06* (2013.01); *H02B 13/045* (2013.01); *H02B 1/22* (2013.01); *H02B 13/0352* (2013.01)

(58) Field of Classification Search
CPC ...... H02B 13/005; H02B 13/045; H02B 1/16; H02B 1/20; H02B 5/06
USPC ....... 361/600, 602, 603, 604, 611, 612, 614, 361/618
See application file for complete search history.

(56) References Cited

U.S. PATENT DOCUMENTS

| 3,236,933 A | 2/1966 | Frowein |
| 3,932,720 A | 1/1976 | Gaigg |

(Continued)

FOREIGN PATENT DOCUMENTS

| CH | 558 093 A | 1/1974 |
| DE | 1 515 367 A | 2/1970 |
| EP | 0 593 344 A1 | 4/1994 |

OTHER PUBLICATIONS

International Search Report for PCT/EP2014/053407 dated May 12, 2014.
U.S. Appl. No. 14/767,756, filed Aug. 13, 2015.

*Primary Examiner* — Anthony Haughton
(74) *Attorney, Agent, or Firm* — Pearne & Gordon, LLP (57) ABSTRACT

The invention relates to a removable stabilizer for a spacer casing (24*a*-24*f*) of an electrical installation of the GIS type (20), the spacer casing (24*a*-24*f*) comprising a first opening (33) as well as a conductor (30*b*) provided with a bore (34), the removable stabilizer (29) comprising a plug (29*a*) configured to be introduced via the first opening (33) into the spacer casing (24*a*-24*f*), the plug being designed to penetrate into the bore (34) of the conductor (30*b*) so as to block said conductor (30*b*) against moving in translation after said spacer casing (24*a*-24*f*) has been put to atmospheric pressure.

21 Claims, 8 Drawing Sheets

(51) Int. Cl.
*H02B 1/20* (2006.01)
*H02B 13/02* (2006.01)
*H02B 13/00* (2006.01)
*H02B 3/00* (2006.01)
*H02B 5/06* (2006.01)
*H02B 13/045* (2006.01)
*H02B 1/16* (2006.01)
*H02B 1/22* (2006.01)
H02B 13/035 (2006.01)

(56) References Cited

U.S. PATENT DOCUMENTS

| | | | | |
|---|---|---|---|---|
| 4,744,002 | A * | 5/1988 | Nakano | H02B 1/22 218/80 |
| 4,967,307 | A * | 10/1990 | Itou | H02B 1/22 361/612 |
| 5,453,910 | A * | 9/1995 | Itou | H02B 5/06 361/604 |
| 6,188,034 | B1 * | 2/2001 | Tsuzura | H02B 13/0352 218/155 |
| 6,399,911 | B1 * | 6/2002 | Tsuzura | H02B 1/22 218/43 |
| 6,556,428 | B1 * | 4/2003 | Takahoshi | H02B 1/22 361/604 |
| 6,664,493 | B2 * | 12/2003 | Yamada | H02B 5/06 218/43 |
| 6,727,454 | B2 * | 4/2004 | Okabe | H02B 5/06 218/43 |
| 6,759,616 | B2 | 7/2004 | Rokunohe | |
| 7,414,827 | B2 * | 8/2008 | Kashiwa | H02B 5/06 218/90 |

* cited by examiner

METHOD OF EXTRACTING A JACKET OF A GAS INSULATED SUBSTATION (GIS) UNDER A METAL CASING

TECHNICAL FIELD

The invention relates to the maintenance and repair of high- or medium-voltage gas-insulated substations, commonly referred to as Gas-Insulated Substations (GISs). Substations of this type comprise switchgear, in particular busbar disconnectors, circuit-breakers, or grounding switches. Pieces of switchgear are generally insulated using sulfur hexafluoride ($SF_6$) in tanks under pressure, at a service pressure of 0.4 megapascals (MPa) to 0.8 MPa, e.g. 0.7 MPa.

GISs may be subdivided into single phase and three-phase equipment. In three-phase equipment, the three phase conductors are confined to a common tank. In single-phase equipment, a tank accommodates one phase only.

From a technical point of view, the present invention relates equally well to single-phase equipment and to three-phase equipment.

It also relates to occupational health and safety (OHS).

An example GIS comprises a plurality of circuit breakers, one or more sets of busbars and one disconnector per set of busbars. The busbars connect the circuit breakers together. A respective disconnector is interposed between each set of busbars and each circuit breaker. A subdivision of the GIS, referred to as a bay, groups together a circuit breaker, a portion of each corresponding set of busbars, the interposed disconnectors, and a spacer casing for each disconnector.

STATE OF THE PRIOR ART

Figure 1:
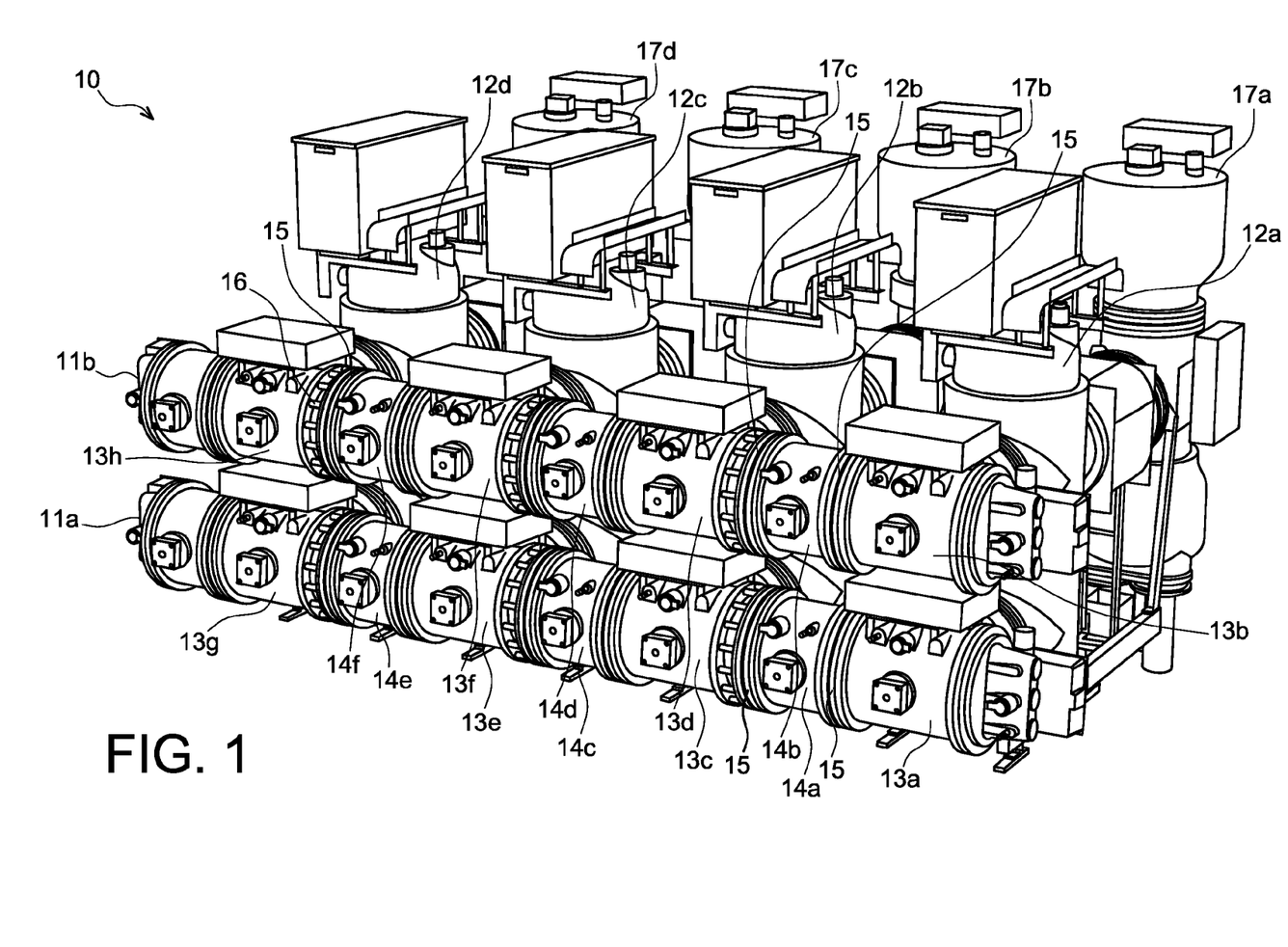
FIG. 1 is a perspective view of an existing GIS having sets of busbars, circuit breaker casings, disconnector casings, and spacer casings, the disconnector casings connecting the sets of busbars to the circuit breaker casings, the spacer casings connecting the disconnector casings together in pairs.
Figure 2:
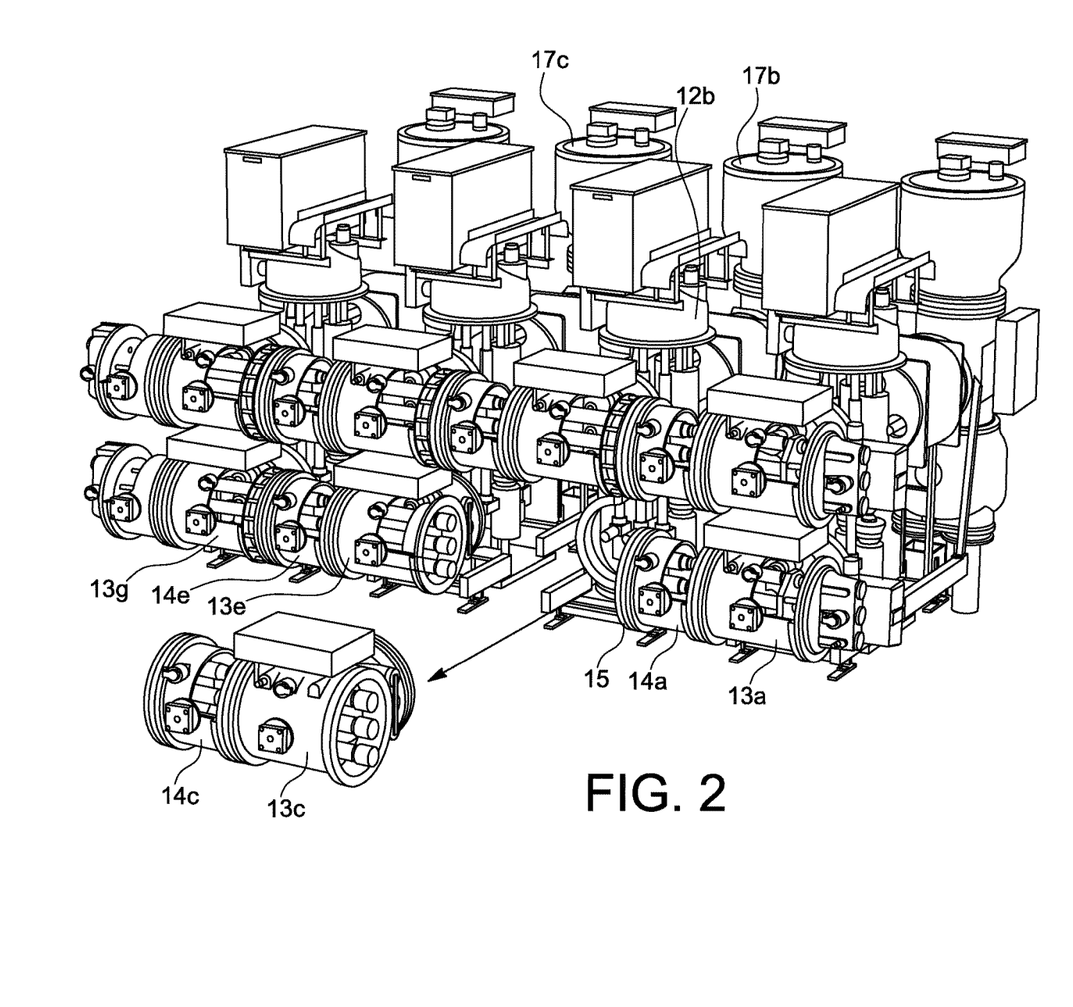
FIG. 2, partially cut-away in order to illustrate the disposition of the phase conductors in the casings, shows the GIS of FIG. 1 from which a disconnector casing and its associated spacer casing have been extracted.

In more detailed manner, the GIS 10 that can be seen in FIGS. 1 and 2 includes two sets of busbars 11a and 11b, four circuit breaker casings 12a to 12d (each corresponding to a bay 17a to 17d), eight disconnector casings 13a to 13h, and six spacer casings 14a to 14f.

The casings 12a to 12d, 13a to 13h, and 14a to 14f are metal tanks filled with insulating gas under pressure. Gastight supporting insulators 15, situated at each interface between the casings 13a to 13h and the casings 12a to 12d or 14a to 14f, prevent any exchange of $SF_6$ gas between adjacent casings, i.e. each casing 12a to 12d, 13a to 13h, and 14a to 14f forms an independent unit under pressure.

In this example, each set of busbars 11a and 11b includes three conductors, which are the busbars proper. Each of these busbars extends over the entire width of the GIS 10, in the disconnector casings and in the spacer casings.

Each casing 12a to 12d makes it possible to insulate its bay 17a to 17d from the downstream network.

In FIG. 1, two disconnector casings 13a and 13b form the interfaces between the casing 12a and respective sets of busbars 11a or 11b. Each of the other casings 12b to 12d is connected in the same way to two disconnector casings among 13c to 13h. The disconnector casings 13a to 13h make it possible to isolate one of the circuit breaker casings 12a to 12d electrically from one or the other of the sets of busbars 11a and 11b.

Each disconnector casing 13a to 13h is separated from the adjacent disconnector casing by a spacer casing 14a to 14f. By way of example, the casing 13a is separated from the adjacent casing 13c by the spacer casing 14a.

Strictly speaking, the casings 14a to 14f are optional, i.e. a GIS could operate with the casings 13a and 13c fastened one on the other. However, the intermediate casings 14a to 14f are used in order to facilitate access to the bays.

On only one of its two interfaces with an adjacent spacer casing 14a to 14f, each casing 13c to 13h includes a removable coupling unit 16. By way of example, said coupling unit 16 is made up of a plurality of screws. The casings 13a and 13b are at an end of the set of busbars and do not include said coupling unit.

In order to take action on a disconnector, it is necessary to isolate its casing from the set of busbars.

By way of example, in FIG. 2, the casing 13c has been extracted from the bay 17b. The interface between the casings 13c and 14c is not removable and those two elements have been extracted as one block.

It should be noted that when the casing 13c is removed, the supporting insulator 15 separating the casing 13c from the circuit breaker casing 12b remains attached to the casing 13c. Since gas insulation is no longer provided, the current needs to be interrupted in the bay 17b in advance.

In addition, the supporting insulator 15 separating the spacer casing 14c from the disconnector casing 13e remains attached to 14c after removal. It should thus be noted that, prior to removal, the disconnector casing 13e should be filled with air at atmospheric pressure. Electricity must therefore also be disconnected from the bay 17c under consideration.

Finally, the insulator 15 separating the casing 13c from the spacer casing 14a remains attached to 14a, which remains on the GIS 10.

Removing the disconnector casing 13c from the GIS is performed as follows:

grounding the bays 17b and 17c and the set of busbars 11a;

emptying the circuit breaker casing 12b, the disconnector casings 13c and 13e, and the intermediate casing 14c of their insulating gas, which is replaced by air at atmospheric pressure;

lowering the internal pressure of the casings 14a and 14e to an intermediate pressure in order to limit the pressure differential on either side of the supporting insulators 15 that are then exposed to ambient pressure; and after disengaging the coupling unit 16 between the casings 14a and 13c and between the casings 14c and 13e, proceeding to physically extract casings 13c and 14c.

That GIS structure therefore requires two adjacent bays to be taken out of service in the event of a disconnector failing.

Thus, each time a bay is taken out of service, the distribution of electricity downstream is at risk of being interrupted.

Moreover, any emptying of the insulating gas of a casing and any removal requires time.

Finally, $SF_6$ is a powerful greenhouse gas and any handling of $SF_6$ that can be avoided correspondingly limits the risk of leakage.

U.S. Pat. No. 6,759,616 describes a bay for gas-insulated switchgear.

That bay includes a circuit breaker, a first disconnector on the load side in a tank, and second and third disconnectors on the busbar side in another tank. A first insulated bushing connects the first disconnector to the load, and second and third insulated bushings connect the second and the third disconnectors to respective busbars. Gastight insulators successively separate the first insulated bushing, the disconnector on the load side, the circuit breaker, and the disconnectors on the busbar side. Other insulators of the same type connect the disconnectors on the busbar side to respective insulated bushings on the busbar side.

Nonetheless, that patent does not disclose a gas-insulated busbar.

In addition, and contrary to the technical problem that said U.S. Pat. No. 6,759,616 claims to solve, the switchgear that it discloses does not make it possible to perform maintenance operations without disconnecting the busbars. By way of example, in FIG. 16 of U.S. Pat. No. 6,759,616, a plurality of metal conductors, including those connected to the busbars, are immersed in the same gas-insulated central casing. By lowering the pressure in said casing, after closing the load disconnector, gas insulation is no longer provided, thereby producing an electric arc from the busbars.

The present invention aims to improve the maintenance and repair of a disconnector that is out of use, relative to already-existing devices.

SUMMARY OF THE INVENTION

The invention provides a removable stabilizer for a spacer casing of an electrical installation of the GIS type, the removable stabilizer being configured to be fastened mechanically to a conductor in said spacer casing so as to block said conductor against moving in translation after said spacer casing has been put to atmospheric pressure.

Such a stabilizer makes it possible to take action on the electrical installation in particularly safe and simple manner by securing the conductor to its spacer casing. The conductor, the spacer casing, and the stabilizer then have a safe holding position in which the stabilizer is integral with the conductor and the spacer casing.

According to an advantageous embodiment, the spacer casing includes a first opening and a conductor fitted with a bore, the removable stabilizer comprises a plug configured to be introduced into the spacer casing via the first opening, the plug being designed to penetrate into the bore of the conductor.

In an additional advantageous embodiment, the removable stabilizer comprises a socket configured to be inserted via a second opening into the spacer casing and to receive an end of the plug.

Advantageously, the plug and the socket are configured to be screw-fastened respectively to the first opening and to the second opening.

In a variant, the plug is configured to be screw-fastened on the socket.

In another advantageous embodiment, one end of the plug is configured to be placed in a housing included in the spacer casing, the housing being situated on the side of the casing opposite from the first opening.

Advantageously, the plug is configured to be screw-fastened to the first opening.

In a variant, the plug is configured to be screw-fastened in said housing.

The plug may be placed through the first opening and may comprise a head of diameter that is at least equal to the diameter of the first opening.

The plug may comprise a body having at least one end portion of diameter that is less than or equal to the diameter of the bore and may thus be placed in the bore of the conductor.

When the stabilizer includes a socket, the socket may be placed through the second opening and may comprise a head of diameter that is at least equal to the diameter of the second opening.

The socket may comprise a housing in which the end of the plug may be placed.

When the plug is configured so as to be screwed to the first opening, the plug may be threaded on its head or its body. Such a thread may cooperate with a corresponding thread of the spacer casing, which casing is, for example, provided on the periphery of the first opening.

The socket may be threaded on its head or on the outside of its body. Such a thread may cooperate with a corresponding thread of the spacer casing, situated for example on the periphery of the second opening.

When the plug is configured to be screwed onto the socket, an inside surface of the housing of the socket may be threaded to cooperate with a corresponding thread of the end of the plug.

The end of the plug may be of a diameter that is less than or equal to the diameter of the housing included in the wall of the spacer casing, facing the first end.

When the plug is configured to be screwed into the housing included in the spacer casing, the plug includes a thread on its end and the spacer casing includes a corresponding thread in the housing.

The invention also provides a spacer casing including at least a first conductor, at least a removable stabilizer as described above, and at least one first opening for inserting the plug of said removable stabilizer.

Said first conductor may include a bore for receiving said removable stabilizer.

Such a spacer casing may include at least a second conductor and a connection member mechanically connecting said conductors to one another, the removable stabilizer co-operating with the connection member so that all of said conductors can be blocked against moving in translation relative to the spacer casing after said spacer casing has been put to atmospheric pressure.

The connection member may include external means outside the spacer casing, e.g. a flange.

In a variant, the connection member may form part of the wall of the spacer casing, said casing including at least one auxiliary opening, a stabilizing rod being housed in the auxiliary opening and in a bore in the second conductor, when the spacer casing is in its holding position.

The connection member may further be a strap fastened to the two conductors, e.g. riveted, in the spacer casing.

The invention also provides a method of extracting a disconnector casing from a bay of an electrical installation of the GIS type, said bay presenting a circuit breaker casing connecting the electrical installation to a distribution network, the bay further presenting a first spacer casing that is adjacent to the disconnector casing, the electrical installation comprising a set of busbars, the disconnector casing and the spacer casing each having a respective portion of the set of busbars passing therethrough, with the disconnector casing, the circuit breaker casing and the spacer casing each forming, when they are filled with insulating gas at a determined service pressure, an independent unit under pressure, the method comprising the following steps:

grounding said bay and said set of busbars;
replacing the insulating gas at service pressure in the circuit breaker casing, said disconnector casing, and said first spacer casing with air at atmospheric pressure;
fitting, in the first spacer casing, a removable stabilizer as described above; and
physical extraction of the disconnector casing from the GIS.

A first insulating element may be placed between the disconnector casing and the circuit breaker casing and a second supporting insulator element may be placed between the disconnector casing and the first spacer casing, these supporting insulators being held on the disconnector casing after extraction.

The electrical installation may further comprise a second spacer casing adjacent to said disconnector casing, comprising a step of lowering the internal pressure of the second casing to a pressure level that is less than the service pressure, the lowering step taking place before the physical extraction of the disconnector casing but after grounding of said set of busbars.

The disconnector casing may thus be separated from the second spacer casing by a third supporting insulator. Said supporting insulator may remain attached to the second spacer casing after physical extraction of the disconnector casing from the GIS.

By way of example, the internal pressure of the second spacer casing, after lowering, lies in the range 0.1 MPa to 0.5 MPa, also by way of example, in the vicinity of 0.2 MPa.

In a variant, the internal pressure of the second spacer casing after lowering is atmospheric pressure and the supporting insulator remains attached to the disconnector casing after physical extraction.

A removable stabilizer may thus be fitted on the second spacer casing.

Still in a variant, the internal pressure of the second spacer casing, after lowering, is equal to atmospheric pressure, and a step of fitting a removable stabilizer on the second spacer casing is performed.

The invention presents the advantage of limiting the number of bays needing to be deactivated during maintenance operations. In advantageous manner, the number of interruptions in the electricity distribution networks is thus limited, thus ensuring maximum quality of service.

The invention further relates to GIS comprising a stabilizer and/or a casing as described above, and/or in which the above-described method of extraction may be implemented.

BRIEF DESCRIPTION OF THE DRAWINGS

Embodiments of the invention are described below by way of non-limiting example, and with reference to the accompanying drawings, in which.

DETAILED DESCRIPTION OF PARTICULAR IMPLEMENTATIONS

It should be recalled that the GIS 10 that can be seen in FIGS. 1 and 2 is described in the introduction of this application.

Figure 3:
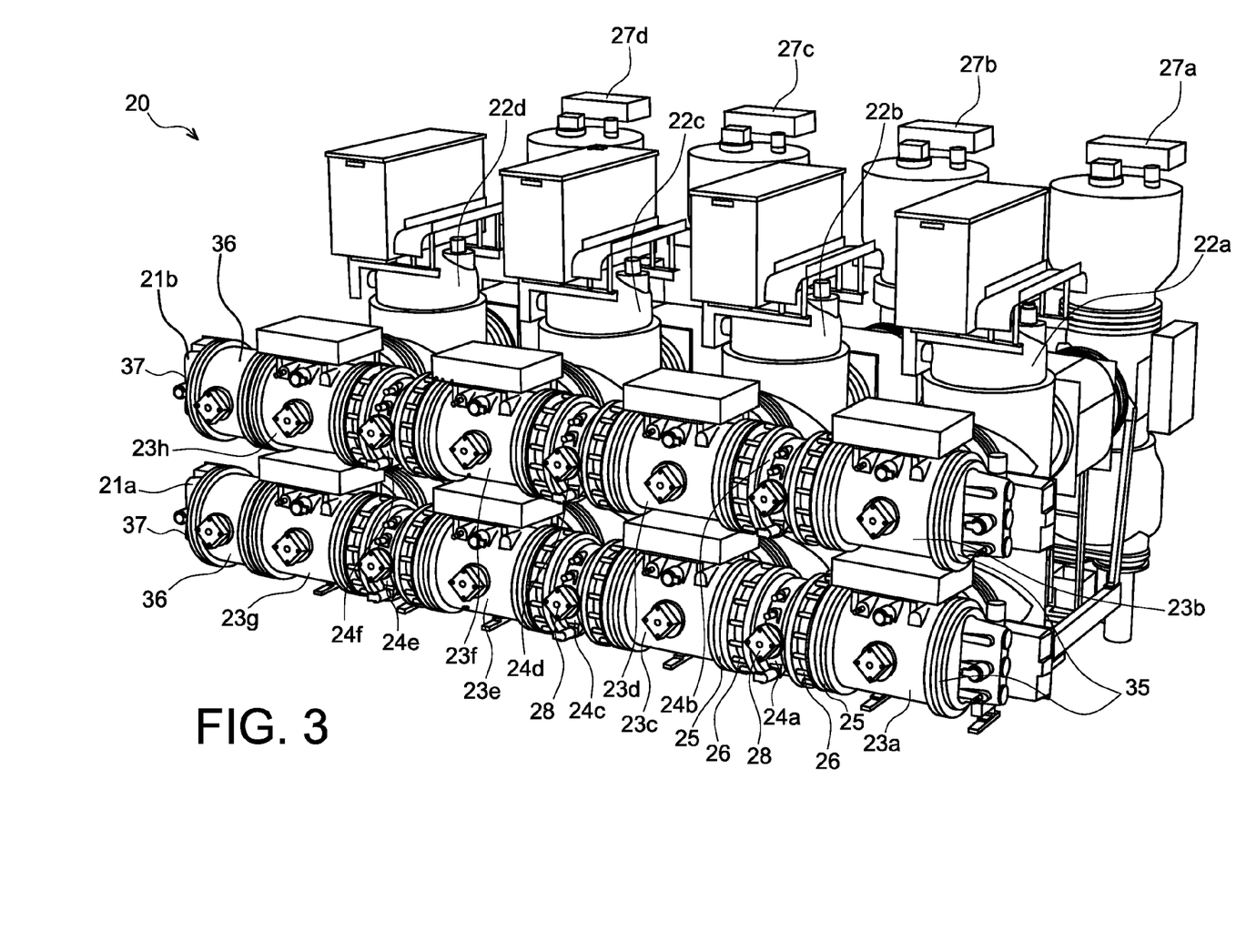
FIG. 3 is a perspective view of a modified GIS having sets of busbars, circuit breaker casings, disconnector casings, and spacer casings, the disconnector casings connecting the sets of busbars to the circuit breaker casings, the spacer casings connecting the disconnector casings together in pairs, each spacer casing including two coupling units.

FIG. 3 shows a GIS 20 that is modified in comparison with the GIS 10.

The GIS 20 presents two sets of busbars 21a and 21b, four circuit breaker casings 22a to 22d, corresponding to four bays 27a to 27d, eight disconnector casings 23a to 23h, and six spacer casings 24a to 24f.

Figure 4:
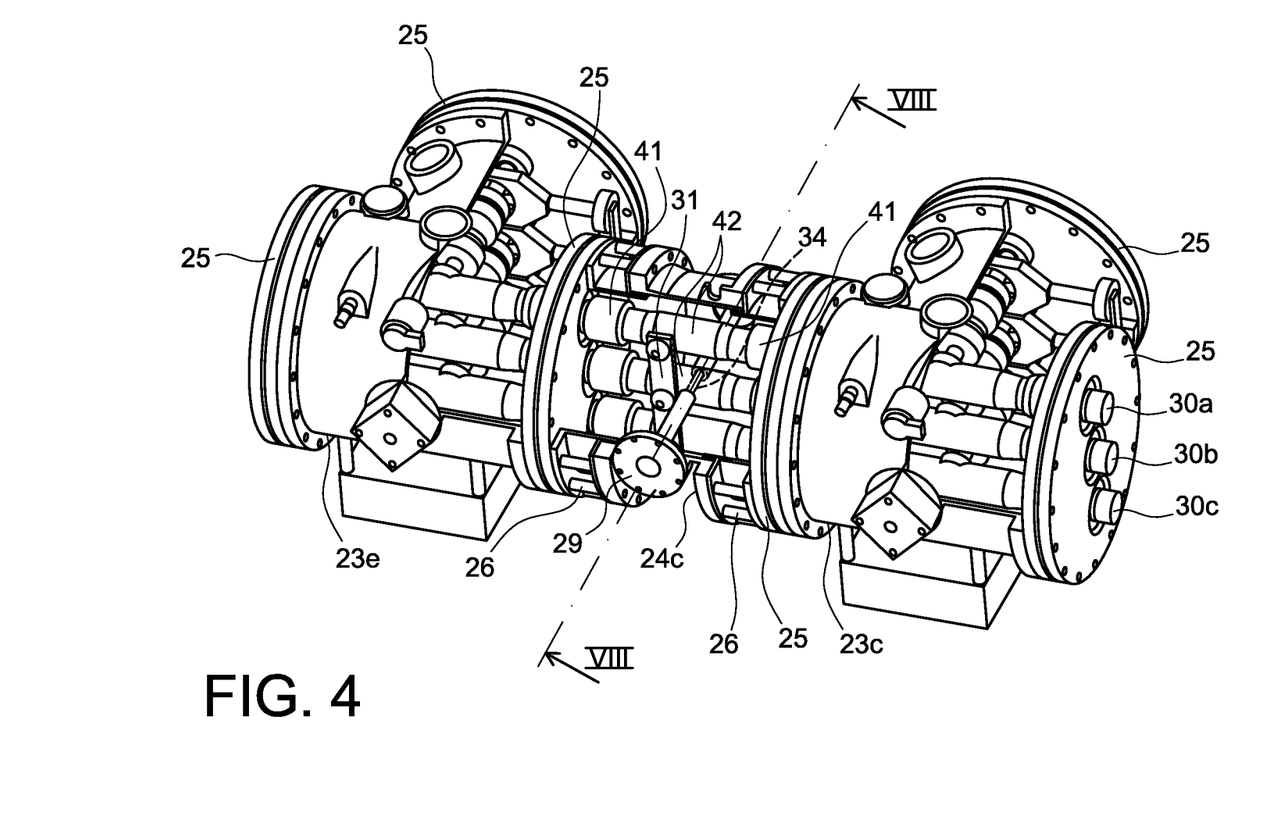
FIG. 4 is a partially cut-away perspective view of two disconnector casings and one spacer casing of FIG. 3, the spacer casing being provided with a strap and a removable stabilizer.
Figure 5:
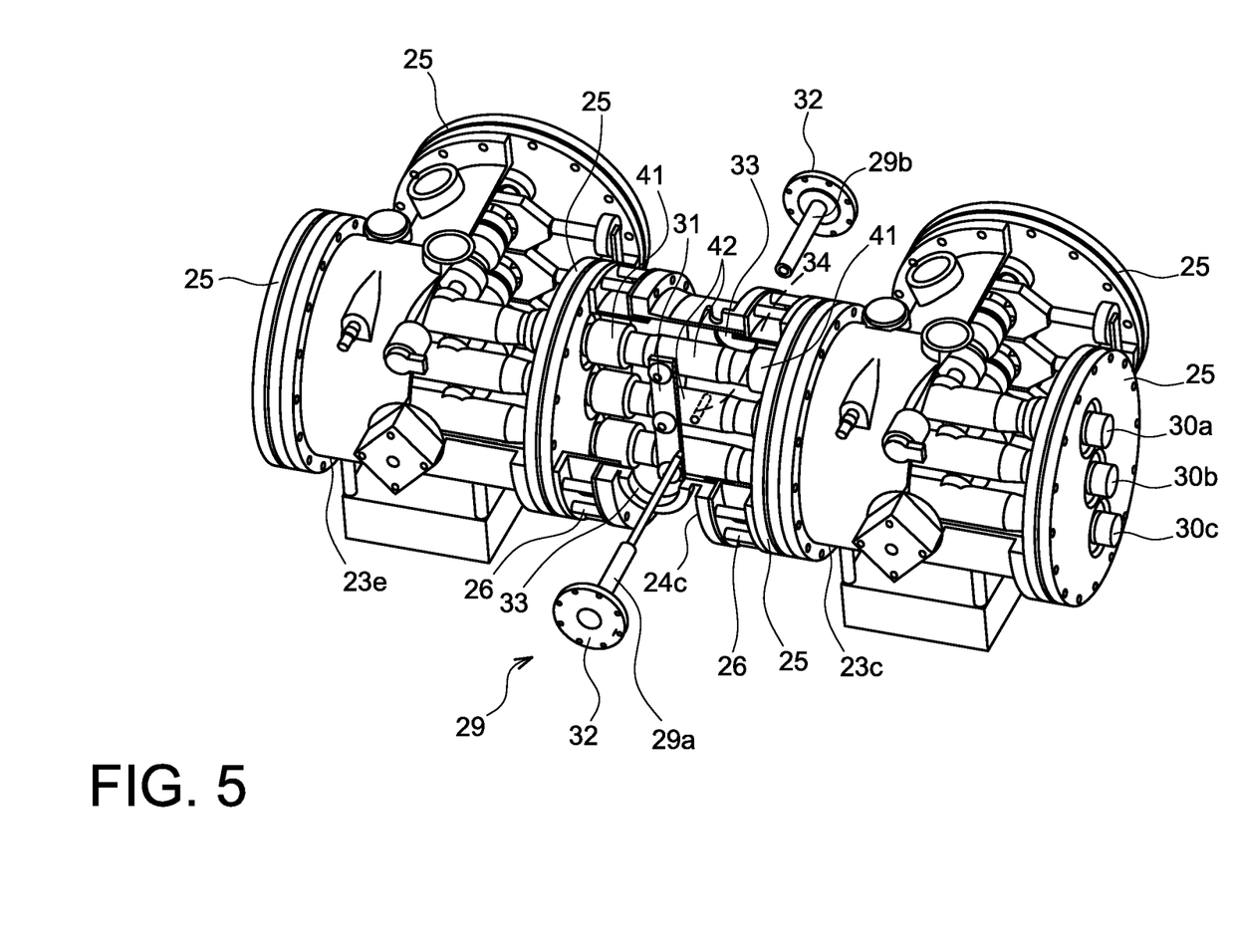
FIG. 5 is the same view as FIG. 4 showing the stabilizer once disassembled.
Figure 8A:
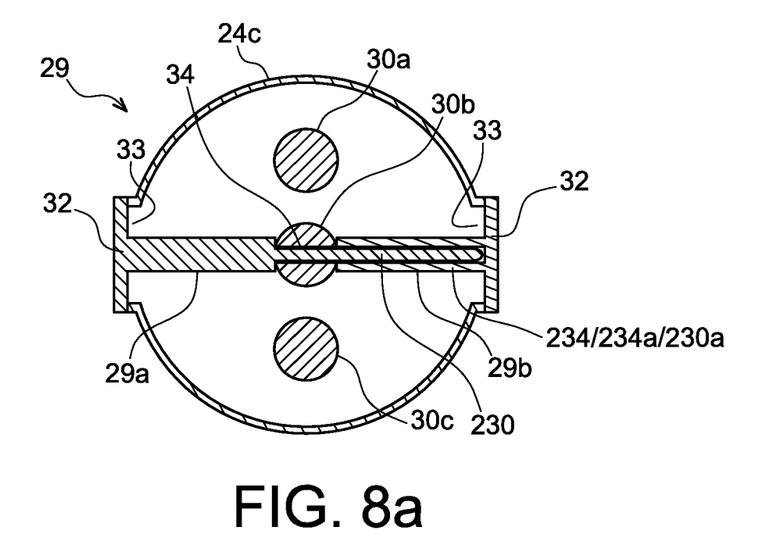
FIG. 8a is a diagrammatic view of the spacer casing of FIG. 4 in cross section on line VIII.

A removable stabilizer 29 adapted to the GIS 20 is provided (see FIGS. 4, 5, and 8a). The stabilizer 29 comprises a plug 29a and a socket 29b. The stabilizer 29 is also provided with two heads 32. Its function is described below.

The casings 22a to 22d, 23a to 23h, and 24a to 24f are metal tanks filled with insulating gas under pressure. Gastight supporting insulators 25, situated at each interface between the casings 23a to 23h and the casings 22a to 22d or 24a to 24f, prevent any exchange of $SF_6$ gas between adjacent casings. Each casing 22a to 22d, 23a to 23h, and 24a to 24f forms an independent unit under pressure.

In this example, each set of busbars 21a and 21b includes three conductors 30a, 30b, and 30c, which are the busbars proper (see FIGS. 4 and 5). Each of these busbars extends over the entire width of the GIS 20, in the disconnector casings and in the spacer casings. In this example, the busbars are oriented in substantially horizontal manner. Each casing 23a to 23h and 24a to 24f covers a respective portion of the set of busbars and serves to provide it with gas insulation.

Along their length, the sets of busbars 21a and 21b comprise combinations of conductive sleeves 41 and rods 42, respectively forming the conductors 30a to 30c. Three sleeves 41 are mounted in each supporting insulator 25, providing electrical connection from one side of each insulator 25 to the other. The rods 42 are plugged into the sleeves 41 and held in position between two successive supporting insulators 25, e.g. on either side of the casing 24c in FIGS. 4 and 5.

For each set of busbars, each rod 42 of the conductor 30b situated in one of the spacer casings 24a to 24f includes a bore 34.

Each circuit breaker casing 22a to 22d makes it possible to insulate the corresponding bay 27a to 27d from the downstream network.

The disconnector casings 23c to 23h are different from the casings 13c to 13h described in the introduction in that they do not have coupling units 16. The casings 23a and 23b, at the end of the sets of busbars likewise do not have coupling units 16.

Each of the disconnector casings 23a and 23b forms the interface between the casing 22a and a respective one of the sets of busbars 21a and 21b. Each of the other casings 22b to 22d is connected in the same way to two disconnector casings.

The disconnector casings 23a to 23h make it possible to isolate one of the circuit breaker casings 22a to 22d electrically from one or the other of the sets of busbars 21a and 21b.

The spacer casings 24a to 24f connect the disconnector casings 23a to 23h together in pairs as shown in FIG. 3. For that purpose, each casing 24a to 24f comprises two coupling units 26. By way of example, the casing 23a is connected to the adjacent casing 23c by the spacer casing 24a. Said spacer casing includes a coupling unit 26 for providing a connection with the casing 23a and another coupling unit 26 for providing a connection with the casing 23c.

Each spacer casing 24a to 24f includes two opposite openings 33, as shown in FIG. 5. Each opening 33 is in register with the bore 34. In service, these openings are closed; in this example, they are closed by a pressure monitoring device 28 (visible in FIG. 3), or by a gastight cap (not shown). An opening 33 may also be used to insert an electric field measuring device, or other tools or measuring equipment.

Each spacer casing 24a to 24f includes a permanently-installed strap 31. In this example, said strap is a strip of insulating material, riveted to each of the conductors 30a to 30c.

The coupling unit 26 is of the same type as the coupling unit 16, e.g. made up of a plurality of screws, except that it is now carried by the spacer casings.

Each bay 27a to 27d comprises a circuit breaker casing, two disconnector casings, each corresponding to one of the sets of busbars, an adjacent spacer casing for each of the disconnector casings, and finally the corresponding portions of each set of busbars that are insulated in the casings of the bay.

There follows a description of the steps taken prior to extracting the disconnector casing 23c in order to take action on the disconnector.

By means of the coupling units 26, the casing 23c may be extracted on its own from the GIS 20, i.e. it may be completely detached from the adjacent spacer casings, in this example the casings 24a and 24c.

Figure 6:
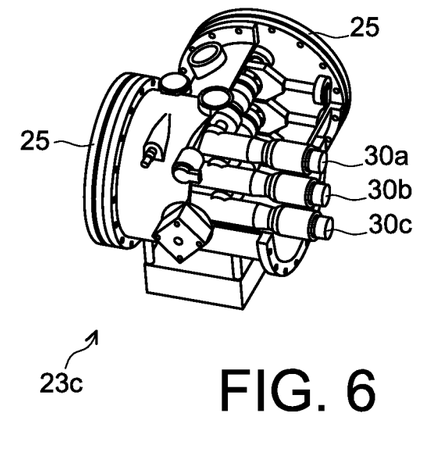
FIG. 6 shows a removed disconnector casing with two supporting insulators.

The supporting insulators 25 separating the casing 23c from the circuit breaker casing 22b and from the spacer casing 24c remain attached to the casing 23c after removal. In contrast, the insulator 25 separating it from the spacer casing 24a remains attached to 24a. FIG. 6 shows the casing 23c once removed as described above, with both insulators 25 still attached. In this example, the insulators are held on respective casings by screws not shown in the figures.

Removing the disconnector casing 23c from the GIS is performed as follows:
grounding the bay 27b and the set of busbars 21a;
emptying the circuit breaker casing 22b, the disconnector casing 23c and the spacer casing 24c of their insulating gas, which is replaced by air at atmospheric pressure;
lowering the internal pressure of the casing 24a to an intermediate pressure in order to limit the pressure differential on either side of the supporting insulator 25 that is then exposed to ambient pressure;
fitting the stabilizer 29 on the spacer casing 24c as described below, and as shown in FIGS. 4, 5, and 8a; the spacer casing 24c is thus located in a maintenance position in which it may be decoupled and extracted in safe manner; and
after disengaging the coupling unit 26 adjacent to the casing 23c of the casings 24a and 24c, proceeding to physically extract the casing 23c.

In the above steps, although the spacer casing 24c has been filled with air at atmospheric pressure, the adjacent disconnector casing 23e remains filled with $SF_6$ at service pressure. The insulator 25 separating the casings 24c and 23e is therefore subjected on one of its faces to the service pressure, and on the other to atmospheric pressure. With this considerable pressure difference on either side, the impacts caused by extracting the casing 23c risk causing the insulator 25 to burst, injuring an operator and releasing $SF_6$ into the atmosphere.

In order to avoid this sort of incident, it is necessary to fit the stabilizer 29 in the spacer casing 24c prior to extracting the casing 23c. This is known as retrofitting.

The openings 33 of the pressure monitoring device 28 and of the cap are opened.

Then, the socket 29b is inserted in the bore 34 via an opening 33. An end portion 230 of the plug 29a is introduced into a housing 234 that comprises the socket 29b via the opposite opening 33. The plug 29a and the socket 29b are thus clamped together by screw-fastening at the openings 33 (e.g. in or around each opening). The heads 32 can be used as bearing surfaces for the screw-fastening. On being clamped, the heads 32 make contact with the body of the spacer casing 24c (see FIGS. 4 and 8a).

Alternatively, the plug 29a may be screw-fastened to the socket 29b rather than screw-fastening each of them around the corresponding openings 33. More precisely, the end portion 230 of the plug 29a may include a thread 230a and the housing 234 of the socket 29b may include a corresponding thread 234a.

The stabilizer 29 thus blocks the central conductor 30b in translation relative to the spacer casing 24c. In other words, via the conductor 30b, the stabilizer 29 bears against the supporting insulator 25 with a force opposing the internal pressure in the casing 23e when the spacer casing 24c is at ambient pressure.

The strap 31 holds the conductors 30a to 30c together mechanically.

The stabilizer 29 and the strap 31, acting together, make it possible to block movement of the set of conductors in translation relative to the casing 24c.

It should be noted that in the spacer casing 24a, the pressure is reduced to an intermediate level between the service pressure (0.7 MPa) and atmospheric pressure (0.1 MPa) so that no supporting insulator 25 needs to withstand the total pressure difference.

The fitting in the spacer casing 24c of a stabilizer 29 for the removal of 23c is described above. Fitting such a stabilizer 29 in the spacer casings 24a, 24b and 24d to 24f for the corresponding disconnector casings is performed in the same manner.

Removal of the disconnector casings 23d to 23f is performed in the same way as for 23c.

It should be noted that for the casings 23a and 23b, an end cap 35 is fastened to the end of the set of busbars, instead of a spacer casing 24a to 24d for 23c to 23f, said cap 35 being firstly electrically insulated from the corresponding set of busbars and secondly gastight and configured to withstand service pressure permanently.

On each casing 23g and 23h, an end casing 36 is fastened in gastight manner. A supporting insulator 25 separates each casing 23g and 23h from its respective casing 36. On the side opposite the insulator 25, the casing 36 is closed by a cap 37 similar to the cap 35. The casing 36 may be put under atmospheric pressure without using the stabilizer 29.

Figure 7:
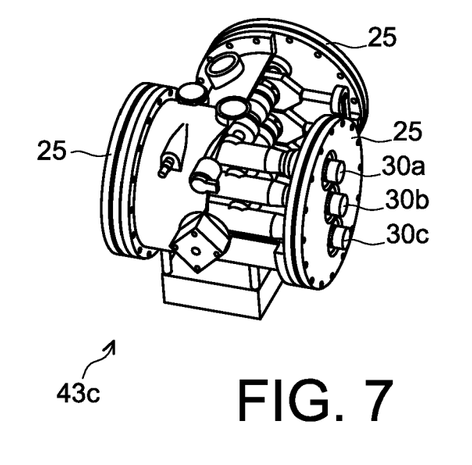
FIG. 7 shows a removed disconnector casing that is similar to that of FIG. 6, with a third supporting insulator.

In a variant shown in FIG. 7, all of the supporting insulators 25 remain attached to the disconnector casing 43c, similar to 23c, that is extracted. Use must therefore be made of the stabilizer 29 on both adjacent spacer casings.

In variants (not shown), one of the two coupling units is located on one of the two adjacent disconnector casings or the two coupling units are located on the casings adjacent to the spacer casings.

The use of $SF_6$ as insulating gas is not limiting. By way of example and in a variant (not shown), use is made of a mixture of N2 and $SF_6$.

In a variant (not shown), the GIS conveys single-phase current, and the sets of busbars have only two conductors. A stabilizer is thus fastened in the same manner on one of the conductors and a strap connecting the two conductors is permanently mounted in the spacer casings.

Figure 8B:
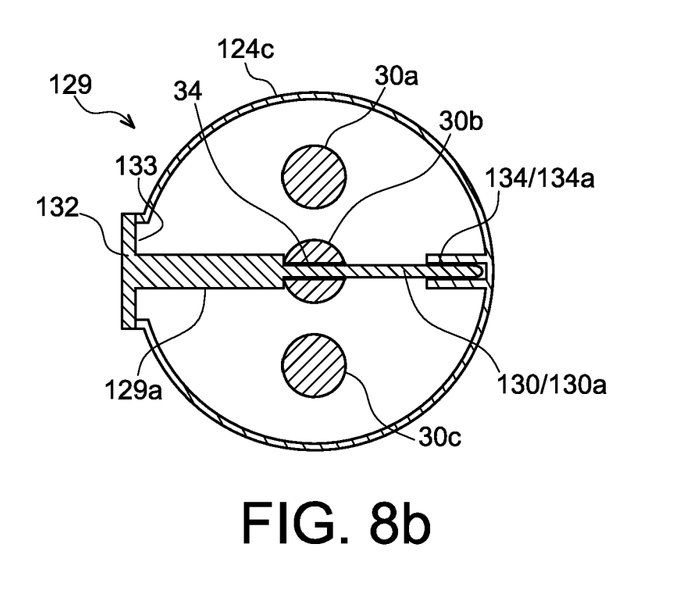
FIG. 8b is a view similar to FIG. 8a of a variant of the spacer casing and of the stabilizer.

In a variant that is shown in FIG. 8b, a spacer casing 124c is provided with a stabilizer 129.

The spacer casing 124c is provided with an opening 133 and a housing 134 that is placed, mounted, or formed on the inside surface of its wall, opposite from the opening 133.

The stabilizer 129 comprises a plug 129a and a head 132. The stabilizer 129 differs from the above-described stabilizer 29 in that it does not have a removable socket.

In order to mount the stabilizer 129 on the spacer casing 124c, the opening 133 is opened and the plug 129a is inserted into the opening 133 by engaging its end 130 in the bore 34 and then in the housing 134. The plug 129a is thus clamped by screw-fastening at the opening 133 (e.g. in or around the opening). Alternatively, the end 130 of the plug 129a may be screw-fastened in the housing 134 rather than around the opening 133. The end 130 thus includes a thread 130a and the housing 134 includes a corresponding thread 134a.

Figure 8C:
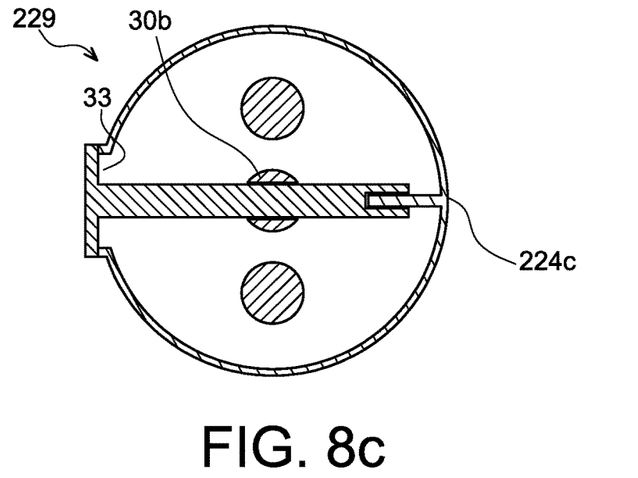
FIG. 8c is a view similar to FIG. 8a of a variant of the spacer casing and of the stabilizer.

In a variant that is shown in FIG. 8c, a spacer casing 224c is provided with a stabilizer 229, in this example, comprising only a plug. The casing 224c is provided with a peg, and the plug 229 is provided with a housing at its end encasing the peg when the plug 229 is mounted on the casing 224c. Various fastener structures are possible, e.g. by screw-fastening the plug 229 onto the periphery of the opening 33, or onto the peg 229, with suitable threads being provided.

In another embodiment (FIG. 9), a spacer casing 324c is used. Its differences with the casings 24c and 124c are described below. Similar elements are given the same numerical references. In this example, the spacer casing 324c is described in a maintenance position, the stabilizer 29 being in place.

Figure 9:
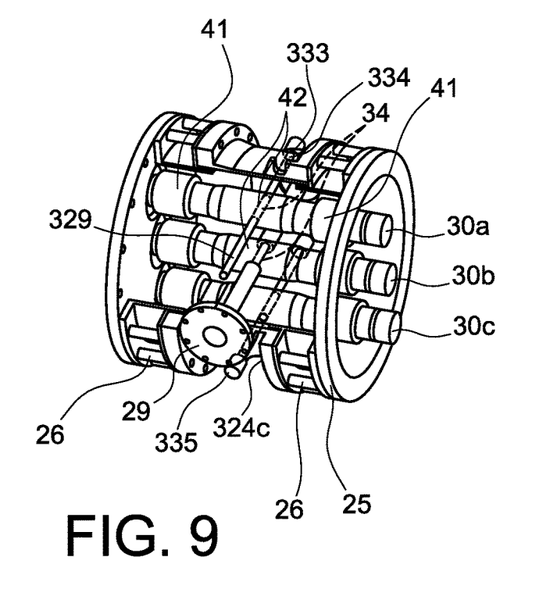
FIG. 9 shows another embodiment of the spacer casing.

In this example, each busbar 42 of the conductor 30a-c placed in the casing 324c includes its own bore 34.

The casing 324c includes auxiliary openings 333 above and below the openings 33 for inserting the stabilizer 29. Four openings 333 are provided in this example, one on each side of each of the upper and lower conductors 30a and 30c and facing the respective bores 34.

In this example, two stabilizing rods 329 are housed in a respective opening 333 and in the corresponding bore 34 of the one of the conductors 30a and 30c.

A cap 335 comes to block the opening 333 opposite the opening 333 for inserting the rods 329, the end of each stabilizing rod 329 being placed in the cap 335, inside the casing 324c.

In a variant, the casing 324c includes only two openings 333 and the end of each stabilizing rod 329 is inserted in a corresponding housing provided on the inside surface of the wall of the casing 324c.

In this example, a flange 334 is placed outside the casing 324c, e.g. against or on the casing. The rods 329 are clamped against the flange 334, e.g. by screw-fastening or by some other means. Clamping the rods 329 outside the casing 324c has the advantage of avoiding any swarf falling into said casing as a result of using threads.

In this embodiment, the rods 329 and the flange 334 advantageously replace the strap 31.

The flange 334 or any other fastener member for combined fastening of the three conductors together and/or relative to the casing 324c can be provided permanently on or against the casing 324c. Part of the wall of the casing 324c can form a mechanical connection member or a fastener member for combined fastening of the three conductors together. The rods 329 can themselves be screw-fastened against the casing 324c, on the periphery of the openings 333, the casing 324c itself providing the mechanical connection between the three conductors 30a-c by means of the stabilizer 29 and of the rods 329. In a variant, the flange 334 is a removable part, that is in place during maintenance actions only. The second spacer casing adjacent to the disconnecter casing that is subjected to extraction can be similar to the structure of the above-described casing 324c. Rods 329 may also be used there.

What is claimed is:

1. A removable stabilizer for a spacer casing of an electrical installation of the GIS type, the spacer casing comprising a first opening and a conductor provided with a bore, the removable stabilizer comprising a plug configured to be introduced via the first opening into the spacer casing, the plug being designed to penetrate into the bore of the conductor so as to block said conductor against moving in translation after said spacer casing has been put to atmospheric pressure.

2. A removable stabilizer according to claim 1, comprising a socket configured to be inserted via a second opening into the spacer casing and to receive an end of the plug.

3. A removable stabilizer according to the preceding claim 2, the plug and the socket being configured to be screw-fastened respectively to the first opening and to the second opening.

4. A removable stabilizer according to claim 2, the plug being configured to be screw-fastened on the socket.

5. A removable stabilizer according to claim 1, one end of the plug being configured to be placed in a housing included in the spacer casing, the housing being situated on the side of the casing opposite from the first opening, the plug being configured to be screw-fastened to the first opening.

6. A removable stabilizer according to claim 1, one end of the plug being configured to be placed in a housing included in the spacer casing, the housing being situated opposite from the first opening, the plug being configured to be screw-fastened in said housing.

7. A spacer casing including at least a first conductor, at least one removable stabilizer according to claim 1, and at least one opening for inserting said removable stabilizer.

8. A spacer casing according to the claim 7, said first conductor including a bore for receiving said removable stabilizer.

9. A spacer casing according to claim 7, including at least a second conductor and a connection member mechanically connecting said conductors together, the removable stabilizer co-operating with the connection member so that all of said conductors can be blocked against moving in translation relative to the spacer casing after said spacer casing has been put to atmospheric pressure.

10. A spacer casing according to claim 9, the connection member including external means outside the spacer casing or a portion of the wall of the spacer casing itself, the spacer casing including at least one auxiliary opening, a stabilizing rod being housed in the auxiliary opening and in a bore in the second conductor.

11. A spacer casing according to claim 9, the connection member being a strap riveted to each of the conductors, in the spacer casing.

12. A method of extracting a disconnector casing from a bay of an electrical installation of the GIS type, said bay presenting a circuit breaker casing connecting the electrical installation to a distribution network, the bay further presenting a first spacer casing that is adjacent to the disconnector casing, the electrical installation comprising a set of busbars, the disconnector casing and the spacer casing each having a respective portion of the set of busbars passing therethrough, with the disconnector casing, the circuit breaker casing and the spacer casing each forming, when they are filled with insulating gas at a determined service pressure, an independent unit under pressure, the method comprising the following steps:

grounding said bay and said set of busbars;
replacing the insulating gas at service pressure in the circuit breaker casing, said disconnector casing, and said first spacer casing with air at atmospheric pressure;
fitting, in the first spacer casing, a removable stabilizer according to claim 1; and
physical extraction of the disconnector casing from the GIS.

13. A method of extracting a disconnector casing according to claim 12, wherein a first supporting insulator is placed between the disconnector casing and the circuit breaker casing and a second supporting insulator element is placed between the disconnector casing and the first spacer casing, these supporting insulators being held on the disconnector casing after extraction.

14. A method of extracting a disconnector casing according to claim 12, wherein the electrical installation comprises a second spacer casing adjacent to said disconnector casing, comprising a step of lowering the internal pressure of the second spacer casing to a pressure level that is less than the service pressure, the lowering step taking place before the physical extraction of the disconnector casing but after grounding of said set of busbars.

15. A method of extracting a disconnector casing according to claim 14, wherein the disconnector casing is separated from the second spacer casing by a third supporting insulator.

16. A method of extracting a disconnector casing according to claim 15, wherein the third supporting insulator remains attached to the second spacer casing after physical extraction of the disconnector casing from the GIS.

17. A method of extracting a disconnector casing according to claim 16, wherein the internal pressure of the second spacer casing after lowering lies in the range 0.1 MPa to 0.5 MPa.

18. A method of extracting a disconnector casing according to claim 17, wherein the internal pressure of the second spacer casing after lowering is of the order 0.2 MPa.

19. A method of extracting a disconnector casing according to claim 15, wherein the internal pressure of the second spacer casing after lowering is atmospheric pressure and wherein the supporting insulator remains attached to the disconnector casing after physical extraction.

20. A method of extracting a disconnector casing according to claim 19, comprising a step of fitting a removable stabilizer on the second spacer casing.

21. A method of extracting a disconnector casing according to claim 12, wherein the internal pressure of the second spacer casing after lowering is equal to atmospheric pressure, comprising a step of fitting a removable stabilizer on the second spacer casing.

\* \* \* \* \*

UNITED STATES PATENT AND TRADEMARK OFFICE
CERTIFICATE OF CORRECTION

| | |
|---|---|
| PATENT NO. | : 9,780,539 B2 |
| APPLICATION NO. | : 14/769853 |
| DATED | : October 3, 2017 |
| INVENTOR(S) | : Heinz Gerber et al. |

Page 1 of 1

It is certified that error appears in the above-identified patent and that said Letters Patent is hereby corrected as shown below:

In the Specification

Column 10, Line 36, "the preceding" should be omitted.

Signed and Sealed this
Twenty-fourth Day of April, 2018

Andrei Iancu
*Director of the United States Patent and Trademark Office*